US012280878B2

(12) United States Patent
Brouwers et al.

(10) Patent No.: US 12,280,878 B2
(45) Date of Patent: Apr. 22, 2025

(54) ICE PROTECTION COATING AND BONDING METHODS THEREOF

(71) Applicant: The Boeing Company, Chicago, IL (US)

(72) Inventors: Edward Brouwers, Havertown, PA (US); Andrew Nowak, Los Angeles, CA (US); Dimitrios Priftis, Mt. Pleasant, SC (US); Michael Jared Ventuleth, Camarillo, CA (US); Kenneth W. Young, Bear, DE (US)

(73) Assignee: The Boeing Company, Arlington, VA (US)

( * ) Notice: Subject to any disclaimer, the term of this patent is extended or adjusted under 35 U.S.C. 154(b) by 161 days.

(21) Appl. No.: 17/674,566

(22) Filed: Feb. 17, 2022

(65) Prior Publication Data

US 2022/0289392 A1      Sep. 15, 2022

Related U.S. Application Data

(60) Provisional application No. 63/158,735, filed on Mar. 9, 2021.

(51) Int. Cl.
*B64D 15/00* (2006.01)
*C09D 175/04* (2006.01)
(Continued)

(52) U.S. Cl.
CPC .......... *B64D 15/00* (2013.01); *C09D 175/04* (2013.01); *C09J 163/00* (2013.01); *C09K 3/18* (2013.01);
(Continued)

(58) Field of Classification Search
CPC ........ C09J 2203/35; B64D 15/10; C09K 3/18; C09K 5/066
(Continued)

(56) References Cited

U.S. PATENT DOCUMENTS

| 8,967,542 B2 * | 3/2015 | Svanebjerg | ............... B64F 5/23 |
| | | | 244/134 C |
| 2012/0160963 A1 * | 6/2012 | Stenzel | ................ C09D 5/1656 |
| | | | 118/305 |

(Continued)

FOREIGN PATENT DOCUMENTS

| CA | 2879734 A1 * | 9/2015 | ............. B64D 15/00 |
| CA | 3051528 A1 * | 3/2020 | ............... B05D 7/24 |

(Continued)

OTHER PUBLICATIONS

Extended European Search Report issued Jun. 7, 2022, in corresponding European application No. 21216868.6.

*Primary Examiner* — Christopher P Ellis
(74) *Attorney, Agent, or Firm* — Walters & Wasylyna LLC

(57) ABSTRACT

An airfoil is provided that includes an exterior substrate surface, and a coating layer adjacent to the exterior substrate surface. The coating layer has an icephobic coating composition that includes a first polymer, a second polymer that is a fluoropolymer, an isocyanate, and a curative. The coating layer is bonded to the airfoil via an intermediate adhesive layer. The coating layer has a bottom surface, and at least one of the exterior substrate surface and the bottom surface has an RMS surface roughness of at least about 1 micron or greater before the coating layer is bonded to the exterior substrate surface.

21 Claims, 5 Drawing Sheets

(51) Int. Cl.
*C09J 163/00* (2006.01)
*C09K 3/18* (2006.01)

(52) U.S. Cl.
CPC ...... *C09J 2203/35* (2020.08); *C09J 2301/302* (2020.08)

(58) Field of Classification Search
USPC ..................................................... 244/134 C
See application file for complete search history.

(56) References Cited

U.S. PATENT DOCUMENTS

| | | |
|---|---|---|
| 2018/0208795 A1 | 7/2018 | Dustin et al. |
| 2018/0215927 A1* | 8/2018 | Rykaczewski ........... B05D 1/18 |
| 2019/0118221 A1* | 4/2019 | Nowak ................... B32B 15/14 |
| 2020/0095488 A1* | 3/2020 | Nowak ............. C08G 18/3206 |
| 2020/0347282 A1* | 11/2020 | Ghasemi ............. C09D 177/00 |
| 2023/0330956 A1* | 10/2023 | Xiang ..................... B29D 7/01 |

FOREIGN PATENT DOCUMENTS

| | | | |
|---|---|---|---|
| CN | 106313811 | 1/2017 | |
| CN | 111670227 A * | 9/2020 | ............. C08G 18/12 |
| EP | 2915747 A1 * | 9/2015 | ............. B64D 15/00 |
| EP | 3 485 987 | 5/2019 | |
| EP | 3626787 A1 * | 3/2020 | ............. B05D 7/24 |
| EP | 4056657 A1 * | 9/2022 | ............. B64D 15/00 |
| WO | WO 2015/048824 | 4/2015 | |

* cited by examiner

PASSIVE ICE PROTECTION
COATING AROUND LEADING EDGE

| ITEM NO. | DRAWING NO. | DRAWING TITLE |
|---|---|---|
| 1 | 114R1752 | LENDING EDGE (L.E. ASSY) |
| 2 | 114R1754 | HEEL ASSEMBLY |
| 3 | 114R1753 | FAIRING ASSEMBLY |
| 4 | " | FAIRING ASSEMBLY |
| 5 | " | FAIRING ASSEMBLY |
| 6 | " | FAIRING ASSEMBLY |
| 7 | 114R1753 | FAIRING ASSEMBLY |
| 8 | 114R1750 | BONDED ASSEMBLY |
| 9 | 114R1750 | BONDED ASSEMBLY |
| 10 | 114R1750 | BONDED ASSEMBLY |
| 11 | 114R1750 | BONDED ASSEMBLY |
| 12 | 114R1750 | BONDED ASSEMBLY |
| 13 | 114R1750 | BONDED ASSEMBLY |
| 14 | 114R1702 | BLADE ASSEMBLY |

ICE PROTECTION COATING AND BONDING METHODS THEREOF

CROSS-REFERENCE TO RELATED APPLICATION

This application claims priority to U.S. Provisional Application No. 63/158,735, filed Mar. 9, 2021, entitled Ice Protection Coating and Bonding Methods Thereof the content of which is incorporated herein by reference in its entirety.

FILED OF DISCLOSURE

Aspects of the present disclosure provide coatings and methods for depositing coatings onto surfaces.

BACKGROUND

Accumulation of frost, ice, or snow on aircraft changes airflow over aircraft wings, reducing lift and increasing drag. The accumulations also add to the total weight, increasing lift required for takeoff. Accordingly, frost, ice, or snow is normally removed prior to take-off. While in flight, hot engine bleed air, electric blankets, mechanical boots, or combinations thereof may be used to keep ice off exterior surfaces of aircraft. These measures, however, consume energy, add weight to the aircraft, and reduce fuel economy.

On the ground, anti-icing and de-icing fluids in the form of hot glycol sprays are used. While effective, such fluids generate an added expense and may cause gate delays from additional application time. Current solutions for de-icing of flight critical surfaces, for example, rotorblades and leading edges and wings, can also involve use of active heating with engine bleed air routed directly behind the leading edge, expandable boots (thumpers) capable of cracking ice from a surface, or electric heaters. Such de-icing solutions require power input from the vehicle drawing away from limited power budgets. As a result, new options for passively removing ice from aircraft are desirable.

Fluoropolymers (e.g., Teflon®) can be coated onto a surface to reduce or prevent ice accumulation. However, conventional methods, such as conventional spray coating methods, for forming coatings, such as fluoropolymer coatings, provide coatings having voids which can limit the mechanical properties and/or smoothness of the outer surface of the coating which can limit resistance to sand and rain at high speed (e.g., 400 mph-500 mph).

To date, there have been no demonstrations of a durable anti-ice coating capable of withstanding leading edge conditions. Previous disclosures of anti-ice or icephobic coatings have not provided bonding strategies for bonding free-standing icephobic coatings/films to an aero vehicle surface.

There is a need for improved methods for bonding smooth void-free, icephobic coatings to a substrate.

SUMMARY

Aspects of the present disclosure provide coatings and methods for depositing coatings onto surfaces. In particular, methods for bonding anti-ice or icephobic coatings to an aero vehicle surface such as a rotorblade or a leading edge of a wing are provided herein.

Aspects of the present disclosure provide an airfoil comprising: an exterior substrate surface; and a coating layer adjacent to the exterior substrate surface; wherein the coating layer comprises an icephobic coating composition comprising: a first polymer; a second polymer that is a fluoropolymer; an isocyanate; and a curative; wherein the coating layer is bonded to the airfoil via an intermediate adhesive layer; and wherein the coating layer has a bottom surface, and wherein at least one of the exterior substrate surface and the bottom surface has an RMS surface roughness of at least about 1 micron or greater ((Rq)>1) before the coating layer is bonded to the exterior substrate surface. In some embodiments, the airfoil is a wing or a rotor blade of an aircraft. In various embodiments, the airfoil of claim 1, wherein the exterior substrate surface includes at least part of a leading edge of the airfoil.

The icephobic coating composition can further comprise an inert fluorofluid. The inert fluorofluid can be present in an amount in the range of about 1 weight percent to about 50 weight percent, based on the total weight of the coating. In some embodiments, the icephobic coating composition can further comprise an inert fluid configured to provide a lubricating effect.

In various embodiments, the intermediate adhesive layer comprises an epoxy film adhesive or an epoxy resin. The epoxy film adhesive can be an epoxy/amine adhesive. Similarly, the epoxy resin can be an epoxy/amine resin. In some embodiments, the intermediate adhesive layer comprises a pressure sensitive adhesive or a transfer tape configured to bond the coating layer to the exterior substrate surface with the application of pressure.

Methods for bonding an icephobic coating layer to an exterior substrate surface of an airfoil are also provided herein, the methods comprising: providing an epoxy film adhesive layer configured to cover the exterior substrate surface; roughening the exterior substrate surface to provide a roughened substrate surface; roughening a bottom surface of the icephobic coating layer to provide a roughened icephobic coating surface; placing the epoxy film adhesive layer on the roughened substrate surface; placing the roughened icephobic coating layer on the epoxy film adhesive such that the roughened icephobic coating surface is in contact with the epoxy film adhesive layer to provide a layered stack; enclosing the layered stack in a vacuum bag; applying a vacuum to and heating the layered stack enclosed in the vacuum bag; cooling the layered stack; releasing the vacuum; and removing the layered stack from the vacuum bag to provide an icephobic-coated airfoil. In various embodiments, an abrasive pad is used to roughen the exterior substrate surface surface and/or to roughen the bottom surface of the icephobic coating layer.

In some embodiments, the method further includes placing a release film layer on top of the roughened icephobic layer before the step of applying the vacuum. In certain embodiments, the method further includes placing a porous breather layer on top of the release film layer before the step of applying the vacuum.

In various embodiments of the methods described herein, the layered stack is heated at a rate of about 5° F./min until a temperature of about 245° F. is reached, and wherein the layered stack is held at a temperature of about 245° F. for about 90 minutes. In some embodiments, the layered stack is cooled at a rate of about 5° F./min until room temperature is reached.

A method for bonding an icephobic coating layer to an exterior substrate surface of an airfoil is provided herein, the method comprising: providing a pressure sensitive adhesive film layer configured to cover the exterior substrate surface; roughening the exterior substrate surface to provide a roughened substrate surface; roughening a bottom surface of the icephobic coating layer to provide a roughened icephobic coating layer surface; placing the pressure sensitive adhesive film layer on the roughened icephobic coating layer surface; placing the combined icephobic coating layer and the pressure sensitive adhesive film layer on the roughened substrate surface such that the pressure sensitive adhesive film layer is in contact with the roughened substrate surface to provide a layered stack; enclosing the layered stack in a vacuum bag; applying a vacuum to the layered stack enclosed in the vacuum bag; releasing the vacuum; and removing the layered stack from the vacuum bag to provide an icephobic-coated airfoil. In various embodiments, an abrasive pad is used to roughen the exterior substrate surface and/or to roughen the bottom surface of the icephobic coating layer. The method can also include applying the pressure sensitive adhesive layer to the roughened bottom surface of the icephobic coating layer using a mixture comprising water, isopropanol, and soap.

These and other features, aspects, and advantages of the present disclosure will be apparent from a reading of the following detailed description together with the accompanying drawings, which are briefly described below. The present disclosure includes any combination of two, three, four, or more embodiments, features, or elements set forth in this disclosure, regardless of whether such embodiments, features, or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those herein summarized. Further, other aspects and advantages of such embodiments disclosed herein will become apparent from the following detailed description taken in conjunction with the accompanying drawings which illustrate, by way of example, the principles of the described aspects.

BRIEF DESCRIPTION OF THE DRAWINGS

Figure 1A:
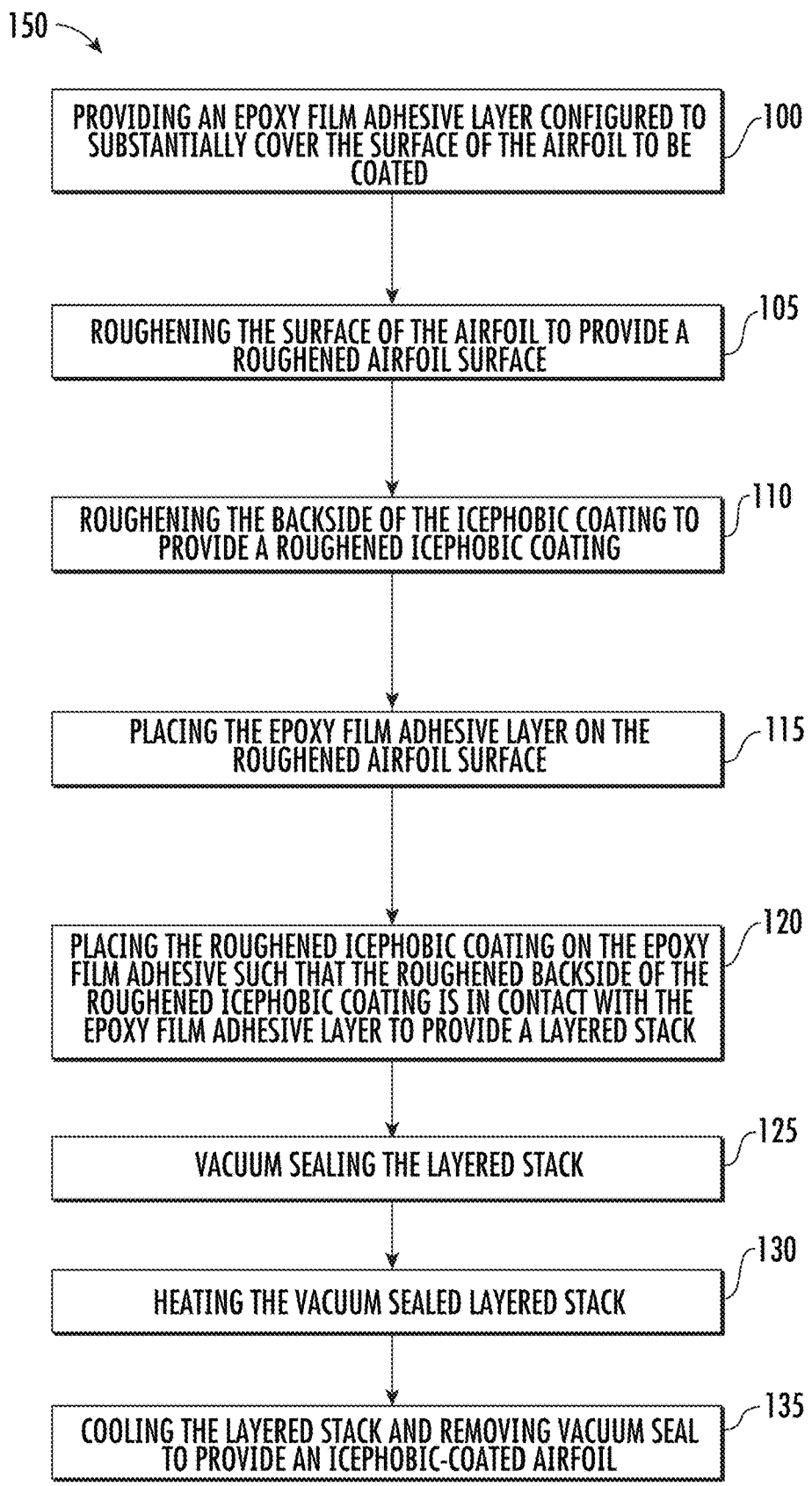
Figure 1B:
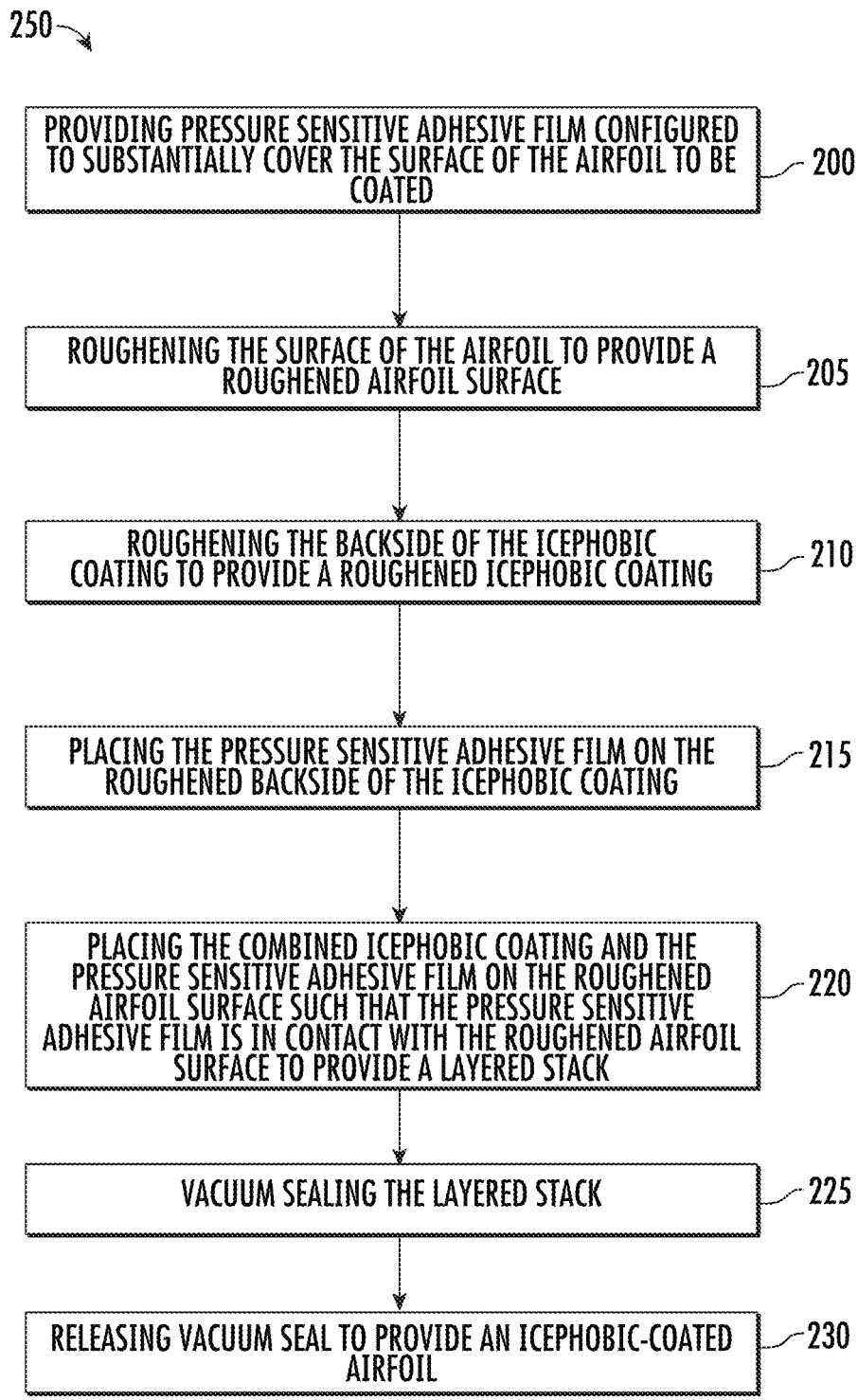
Figure 2:
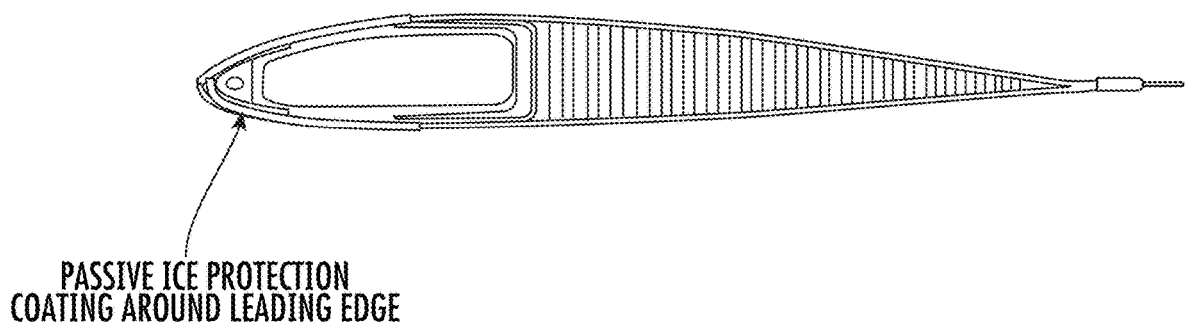
Figure 3:
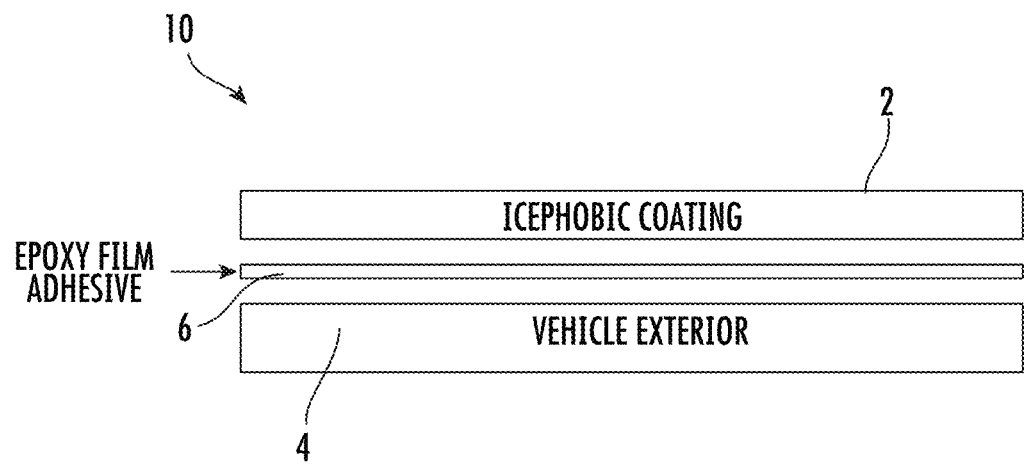
Figure 4:
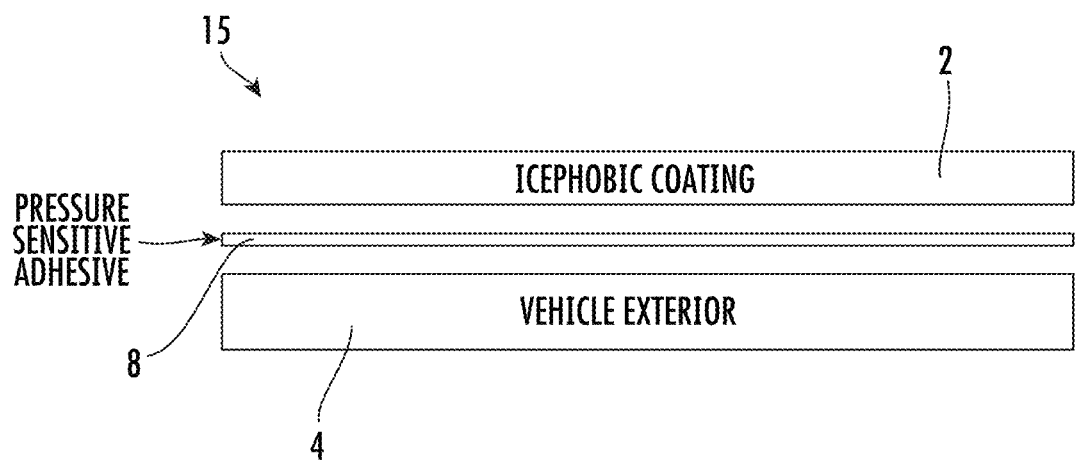
Figure 5:
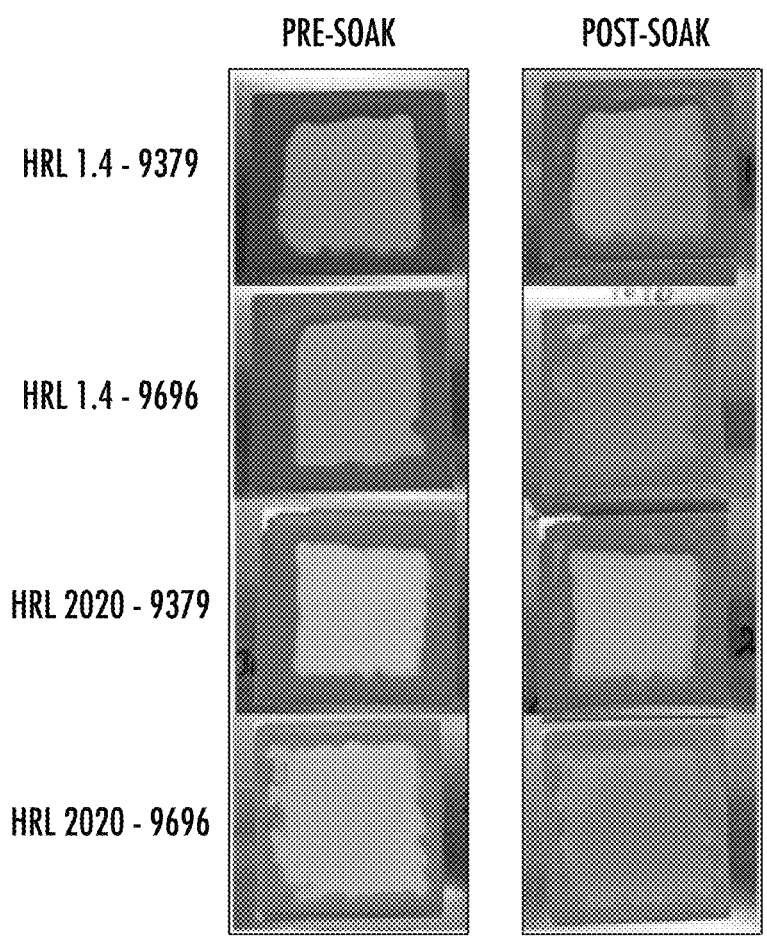

Having thus described the disclosure in general terms, reference will now be made to the accompanying drawings, which are not necessarily drawn to scale, and wherein:

FIG. 1A is a block diagram of embodiments of the bonding methods described herein;

FIG. 1B is a block diagram of embodiments of the bonding methods described herein;

FIG. 2 is a schematic drawing of an exemplary airfoil substrate;

FIG. 3 is a block diagram of a substrate coated with an icephobic coating using an epoxy adhesive layer;

FIG. 4 is a block diagram of a substrate coated with an icephobic coating using a pressure sensitive adhesive film; and FIG. 5 is a series of photographs showing results from a peel test.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Methods for bonding icephobic coatings to an underlying substrate are provided herein. As used herein, the term "icephobic coating" refers to a coating configured to shed ice under an external force such as an air stream. Coatings of the present disclosure provide durability against ice and/or passive ice protection. In other words, coatings of the present disclosure are intended to provide anti-ice or de-icing capabilities of the coated surface without the need for application of heat or other user-applied forces. The present disclosure combines 1) low surface energy components and hygroscopic elements that act to suppress the freezing point of water dispersed in domains of 1-100 microns, with 2) methods of bonding, to enable the ability to bond icephobic films to a rotor blade or leading edge of a wing where removal of ice is critical. Conventional methods for fluoropolymer deposition provide fluoropolymer coatings having a maximum thickness of about 10 mils, e.g. over a curved surface of the aircraft part because of creep/flow of the deposited coating. In addition, if a fluoropolymer is mixed with a substantial amount of another component, conventional methods for fluoropolymer deposition promote "waxing out" of the fluoropolymer from the deposited layer. Methods for surface bonding preparation and adhesive bonding described herein have demonstrated significantly improved adhesion strength on erosion protection films. The current disclosure includes strong adhesion bonding of free-standing films to the structure, wherein the films also demonstrate low adhesion to ice along with durability against rain, sand, and other elements. The final cast films are rain and sand-resistant for aerospace.

Development of coatings that possess both low surface energy components (i.e., Teflon® like) and hygroscopic elements that act to suppress the freezing point of water (i.e., anti-freeze like) dispersed in domains ~1-100 microns have shown impressive ability to shed ice at low adhesion values. See, e.g., the coatings described in U.S. Pat. Pub. No. 2020/0095488, which is incorporated herein by reference in its entirety. In addition, such coatings have also demonstrated impressive resistance to sand and rain at speeds typical of aerospace vehicles. While the combination of these two properties are unique, in order to realize the full potential of the technology it is important to be able to bond these anti-icing coatings to a surface (e.g., a leading edge of a wing or rotor blade). The bonding strength needs to be such that water absorption, thermal extremes, particle and rain erosion impact, ice impact, accumulation, shedding, and aerodynamic forces, which all conspire to cause stresses, strains, initiate damage and dis-bonding propagation, do not eventually lead to failures of the protective coating and/or the bond between the coating and the host structure.

Bond testing is a means of quantifying the bond strength under different loading and environmental conditions, and correlation of the adhesion strength and failure mode under typical bond test methods may be tied to the coating bond-line erosion performance. Therefore, the bond testing can be used as an input to predictor of erosion protection performance predictions in the absence of erosion testing. As described in more detail below, the desired erosion performance, and combination erosion/icing/other environmental effects, may be optimized through methodical surface preparation and adhesive bonding systems and techniques. Bond strength testing and erosion testing together provide critical evidence about the ability of a coating to bond and resist failure, which define it as durable and viable for the application environment.

Icephobic Coating

An ice protection system of the present disclosure can be formed by applying a composition (i.e., an icephobic coating or film) to a surface of a component (e.g., the organic material layer disposed on a vehicle component). As used herein, the term "composition" can include the components of the composition and/or the reaction product(s) of two or more components of the composition. As used herein, the term "mixture" can include the components of the mixture and/or the reaction product(s) of two or more components of the mixture.

Compositions of the present disclosure can include a first polymer, a second polymer that is a fluoropolymer, an isocyanate, optional filler, and a curative (a polyol or a polyamine) having a molecular weight less than the molecular weight of the first polymer. See, e.g., the coatings described in U.S. Pat. Pub. No. 2020/0095488, which is incorporated herein by reference in its entirety.

For example, a composition can be formed by mixing a first polymer and an isocyanate and heating the mixture (e.g., at a temperature of from about 80° C. to about 120° C., such as about 100° C.) with stirring. A molar ratio of first polymer to isocyanate can be from about 1:1 to about 1:20, such as about 1:10. To the mixture, a tin catalyst can be added and stirred at the elevated temperature for from about 1 minutes to about 3 hours, such as about 1 hour. A tin catalyst can be any suitable catalyst configured to promote bonding of the first polymer with an isocyanate, such as any known organo tin catalyst for polyurethane synthesis. In at least one aspect, a tin catalyst is dibutyltin dilaurate.

An isocyanate can be one or more of 4,4'-methylenebis (cyclohexyl isocyanate), hexamethylene diisocyanate, cycloalkyl-based diisocyanates, tolylene-2,4-diisocyanate, 4,4'-methylenebis(phenyl isocyanate), or isophorone diisocyanate. In at least one aspect, a first polymer is a polyester, a polyether, a siloxane, or a combination thereof. For example, a siloxane can be polydimethylsiloxane. In one aspect, a first polymer is selected from poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), or combinations thereof. Alternatively, a first polymer can be selected from one or more of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, poly(ethylene glycol) diacrylate, and/or poly (ethylene glycol) polyacrylates (e.g., triacrylates or greater).

To the mixture containing tin catalyst, a second polymer that is a fluoropolymer is added. A molar ratio of first polymer to second polymer can be from about 0.1:1 to about 1:0.1, such as about 1:1. The mixture containing the second polymer can be heated (e.g., at a temperature of from about 80° C. to about 120° C., such as about 100° C.) with stirring for from about 1 minute to about 3 hours, such as about 1 hour. A fluoropolymer can include a polyfluoroether, a perfluoropolyether, a polyfluoroacrylate, a polyfluorosiloxane, a polytetrafluoroethylene, a polyvinylidene difluoride, a polyvinylfluoride, a polychlorotrifluoroethylene, a copolymer of ethylene and trifluoroethylene, a copolymer of ethylene and chlorotrifluoroethylene, or combinations thereof. In at least one embodiment, a fluoropolymer has a number average molecular weight of from about 500 g/mol to about 10,000 g/mol, such as from about 2,000 g/mol to about 5,000 g/mol. Fluoropolymers having a number average molecular weight of from about 500 g/mol to about 10,000 g/mol can provide sufficiently polar and large enough polymers to form a multiphasic composition in the presence of first polymer.

In at least one embodiment, a fluoropolymer is represented by Formula (I):

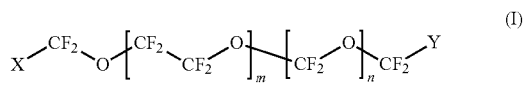

wherein:

X and Y are independently —CH2-(O—CH2-CH2)p-OH or —CH2-(O—CH2-CH2)p-NH2 wherein p is an integer from 0 to 50;

m=1 to 100; and n=1 to 100.

The mixture containing the fluoropolymer, first polymer, and isocyanate can then be allowed to cool, e.g., to about 30° C. to about 40° C. A solvent and a curative are added to the fluoropolymer mixture after or during the cooling such that the mixture, after addition of solvent and curative (e.g., polyol, polyamine, or a mixture thereof), includes from about 1 wt % to about 25 wt % solvent, such as from about 10 wt % to about 20 wt %, based on the total weight of the mixture. A molar ratio of curative to second polymer can be from about 1:1 to about 20:1, such as about 8:1.

The solvent and curative can be added to the mixture (fluoropolymer, first polymer, and isocyanate) sequentially or as a mixture of solvent and curative. The mixture containing fluoropolymer, first polymer, isocyanate, solvent and curative can be stirred for from about 10 seconds to about 1 hour, such as from about 20 seconds to about 1 minute. The mixture containing first polymer, fluoropolymer, isocyanate, solvent and curative is applied to a surface of a component (e.g., the organic material layer disposed on a vehicle component) as described in more detail below. Because of the low amounts of solvent used, the mixture containing first polymer, fluoropolymer, isocyanate, solvent and curative can have a viscosity from about 0.00046 Pa*s to about 1 Pa*s at 25° C., such as from about 0.001 Pa*s to about 0.8 Pa*s at 25° C. as determined by ASTM D445-17a. A mixture of containing first polymer, fluoropolymer, isocyanate, solvent and curative can provide a viscosity sufficiently high, such as 0.00046 Pa*s or greater, to coat non-flat surfaces, such as non-flat metal surfaces, conformally (e.g., conformal deposition onto a curved surface of a vehicle component). The conformal coating can have a substantially uniform thickness across the surface. After curing, the conformal coating can also have a low void content.

A solvent can be a hydrocarbon solvent, an ester solvent, or a fluorinated solvent. A solvent has a boiling point of from about 50° C. to about 200° C., such as from about 100° C. to about 160° C. Ester solvents can include ethyl acetate, n-butyl acetate, or a mixture thereof. Hydrocarbon solvents can include toluene or xylenes. Fluorinated solvents can include 4-chlorobenzotrifluoride. Solvents of the present disclosure can provide dissolution of the components of the mixture in addition to having a boiling point that (in combination with the stage-wise curing described below) provides coatings having little or no voids.

A curative (e.g., a polyol or a polyamine) of the present disclosure can have a molecular weight less than the molecular weight of the first polymer. A polyol can have a molecular weight of 1,000 g/mol or less. A polyol can be selected from 1,4-butanediol, 1,3-propanediol, 1,2-ethanediol, glycerol, trimethylolpropane, or a mixture thereof. A polyamine can have a molecular weight of 1,000 g/mol or less. A polyamine can be selected from ethylenediamine, isophoronediamine, or diaminocyclohexane. Without being bound by theory, it is believed that a curative (e.g., a polyol or a polyamine) of the present disclosure can provide crosslinking of first polymer phases with second polymer phases to provide added strength to a multiphasic system.

In addition, a composition of the present disclosure can optionally further include one or more particulate fillers, a pigment, a dye, a plasticizer, a flame retardant, a flattening agent, and a substrate adhesion promoter. A particulate filler may be selected from silica, alumina, silicates, talc, aluminosilicates, barium sulfate, mica, diatomite, calcium carbonate, calcium sulfate, carbon, wollastonite, or combinations thereof. For example, a filler can be introduced to the composition before or while the first polymer and the isocyanate are being mixed.

In various embodiments, the icephobic coatings described herein can further include an inert fluorofluid. For example, the icephobic coatings can include fluoro-siloxane copolymers and/or perfluoropolyethers. In various embodiments, the icephobic coatings described herein can be provided in the form of a kit comprising two or more parts. For example, a first part of the kit can include an isocyante prepolymer, an isocyanate, and an inert fluorofluid. A second part of the kit can comprise at least one polyol. The first and second parts of the kit can be mixed upon use.

In various embodiments, the inert fluorofluid is present in an amount in the range of about 1 weight percent to about 50 weight percent, about 5 weight percent to about 40 weight percent, about 1 weight percent to about 25 weight percent, or about 25 weight percent to about 50 weight percent, based on the total weight of the coating.

The mixture containing first polymer, second polymer, isocyanate, solvent, and curative (and optional filler) can be applied to a surface of a component (e.g., the organic material layer) and cured. The mixture can be applied to a surface of a component as described in more detail below.

Forming a Free-Standing Film

In at least one aspect, the methods described herein can include forming a free-standing composition film. A mixture of first polymer, second polymer, isocyanate, curative and solvent, as described above, is deposited onto a Mylar sheet, such as silanized Mylar.

For example, a mixture containing first polymer, second polymer, isocyanate, solvent, and curative can be poured onto the Mylar sheet and drawn out across a surface of the Mylar sheet with a doctor blade, draw down bar, direct or reverse gravure, offset gravure, Precision Slot Die, or Meyer rod to form a layer. The mixture can be drawn out at line speed of from 1 fpm to about 95 fpm at a coating web width of from about 4" wide to about 24" wide. The mixture can be drawn out in an inert atmosphere, e.g. nitrogen or argon. The layer can have a thickness of about 10 mils or greater. The drawn out mixture (layer) can be cured in a stage-wise process, as described above. In at least one aspect, the mixture is poured onto the Mylar sheet through a gap, such as a slot die.

The free-standing film can be hot pressed at a temperature of from about 90° C. to about 150° C., such as about 100° C. In at least one aspect, two platens are heated to the desired temperature (e.g., 100° C.). The free-standing film is placed between two release layers (e.g., silanized Mylar) and placed in between the hot platens. The hot platens are then closed providing pressure and heat on the film. The thermoplastic will flow and the thickness of the film can be controlled with the use of shims. The platens are then cooled down before pressure is removed. The temperature chosen for hot pressing is dependent on the thermoplastic or polymer film. In at least one aspect, the temperature of the platens is above the Tg (glass transition temperature) of the polymer but below the decomposition temperature.

Bonding of Free Standing-Film to Surface

In at least one aspect, the methods described herein include providing a free standing icephobic coating, which can be prepared as described above. As illustrated in FIGS. 1A and 1B for example, methods 150 and 250 described herein can include bonding the free-standing icephobic film 2 to an airfoil substrate 4. See, e.g., the block diagrams illustrated in FIGS. 3 and 4. As illustrated in FIG. 2, for example, the ice protection coating can be adhered around the leading edge of an airfoil. The composition is the composition formed from the first polymer, second polymer, isocyanate, and curative, as described above. In various embodiments of the present disclosure, the composition (i.e., the free-standing icephobic coating/film) is bonded to a surface of, for example, an airfoil. As is known in the art, surfaces of an airfoil can be characterized as smooth and glossy, which can lead to difficulties in bonding an icephobic coating thereto.

In various embodiments of the present disclosure, an icephobic coating 2 can be bonded to a surface 4 (e.g., an airfoil surface) via an intermediate adhesive layer (e.g., 6 or 8, as illustrated in FIGS. 3 and 4). According to the present disclosure, protective icephobic coatings such as films and tapes have an appropriate surface preparation, bonding agent and adhesion process applied for sufficient substrate adhesion strength and environmental durability. Smooth and glossy surfaces are inherently poor at bond strength due to the minimum surface area, low surface energy, and lack of mechanical joining at the interface. Additionally, coating formulations with fluoro-components for reducing ice adhesion at the functional surface have inherently low bondability at the intended substrate bonding surface. Therefore, it was discovered that surface preparation and adhesion system compatibility is paramount. The icephobic coatings of the present disclosure under operational use may also be susceptible to moisture intrusion and edge peeling depending on the adhesive system used. Therefore, it was discovered that edge/seam sealing systems such as polyurethane or epoxy are required.

Surface bond preparation methods of the present disclosure include roughening the substrate surface to be coated with the icephobic coating, as illustrated at operation 105 in FIG. 1A, and at operation 205 in FIG. 1B. In certain embodiments, the entire substrate surface (e.g., airfoil surface) intended to be coated can be roughened. In some embodiments, only a portion of the substrate surface intended to be coated can be roughened. The substrate surface can be roughened by a combination of scuff sanding with an abrasive pad (e.g., Scotch-Brite) and/or grit blasting with, for example, 180 grit aluminum oxide, to produce a uniformly dull surface finish of substrate surface. It is noted that any type of grit or abrasive pad known in the art can be used to roughen the substrate surface. After roughening the substrate surface, the substrate surface can be subsequently solvent cleaned (e.g., with iso-propyl alcohol). The solvent cleaning can be repeated until removal of all sanding residue is achieved.

In various embodiments, methods of bonding an icephobic coating to a substrate further include roughening a surface of the icephobic coating/film, as illustrated at operation 110 in FIG. 1A and at operation 210 in FIG. 1B. In some embodiments, the entire backside/underside surface of the icephobic coating/film can be roughened. In various embodiments, only a portion of the backside/underside of the icephobic coating/film can be roughened. The icephobic coating/film can be roughened by a combination of scuff sanding with an abrasive pad (e.g., Scotch-Brite) and/or grit blasting with 180 grit aluminum oxide to produce a uniformly dull surface finish of substrate surface. It is noted that any type of grit or abrasive pad known in the art can be used to roughen the coating surface. The particular abrasive method and/or materials used to roughen a surface (e.g., a coating and/or substrate surface) can depend on the coating properties (e.g., hardness, ability to resist embedded grit particles at the bond surface, etc.). After roughening the coating/film surface, the coating/film surface can be subsequently solvent cleaned (e.g., with iso-propyl alcohol). The solvent cleaning can be repeated until removal of all sanding residue is achieved.

In various embodiments, an adhesive layer/film can be utilized between the roughened substrate surface and the roughened icephobic coating/film surface (see, e.g, FIGS. 3 and 4). Adhesive options include, but are not limited to, pressure sensitive adhesives (PSA), room temperature epoxy paste adhesives, and elevated temperature epoxy film adhesive. The type of adhesive selected can depend on bonding surface allowances, preferred installation method, and desired level of durability and maintainability/reparability. For PSA applications, an adhesion promoter may double the peel strength. Adhesive consolidation and cure under pressure, such as mechanically applied through vacuum or autoclave pressure, can be used to ensure full wet-out and bonding contact throughout the interface.

In some embodiments, as illustrated in FIGS. 1A and 3 for example, methods described herein (150) can include providing an epoxy film adhesive layer configured to substantially cover the surface of the airfoil to be coated at operation 100. As used herein, an "epoxy adhesive" refers to a mixture with a multifunctional epoxy compound and a multifunctional amine compound. The epoxy compound can be present in an amount of about 50-90 weight percent, about 60-80 weight percent, or about 70-90 weight percent, based on the total weigh of the epoxy adhesive. The amine compound can be present in an amount of about 10-50 weight percent, about 20-40 weight percent, or about 10-30 weight percent, based on the total weigh of the epoxy adhesive.

An epoxy adhesive film layer 6 can be provided, wherein the epoxy adhesive film layer is configured to fully, or at least partially cover a roughened surface of the icephobic coating/film. As illustrated at operations 115 and 120, the epoxy film adhesive layer 6 can be placed on the roughened substrate surface 4, and then the roughened icephobic coating 2 can be positioned on top of the epoxy film adhesive such that the roughened backside of the roughened icephobic coating is in contact with the epoxy film adhesive layer to provide a layered stack. The entire layered stack assembly is then sealed in a vacuum bag. As is known in the art, the vacuum bag can be connected to a vacuum apparatus used to vacuum seal the vacuum bag, as illustrated at operation 125. See, e.g., the vacuum apparatus described in U.S. Pat. Pub. No. 2020/0095488, which is incorporated herein by reference. A vacuum is applied to the bag. A pressure inside the bag during a vacuum bagging process can be from about 1 psi to about 20 psi, such as from about 7 psi to about 10 psi. As illustrated at operation 130, once air is substantially or completely removed from the bond line between the free-standing film and substrate surface, the bagged assembly is transferred to an oven to cure the adhesive (of the pressed assembly). The vacuum sealed stack can be heated at a rate of about 5° F./min until a maximum temperature of at least about 200° F., at about 250° F., or at least about 275° F. is reached (e.g., a maximum temperature of about 245° F.). The vacuum sealed stack can then be held at the maximum temperature for at least about 60 minutes, at least about 90 minutes, or at least about 120 minutes. Following heating as illustrated at operation 135, the vacuum sealed stack can be cooled at a rate of about 5° F./min until room temperature is reached (e.g., a temperature of about 50° F. to about 85° F., or about 60° F. to about 75° F., or about 65° F. to about 70° F.). After curing, the vacuum seal can be released and excess film (if present) can be trimmed from the edges of the component. The vacuum bag can optionally contain one or more breather materials, such as a porous cotton material, disposed within the vacuum bag during the vacuum sealing and curing process. Breather material can provide a connection of the vacuum to the assembly surface.

In various embodiments, as illustrated in FIGS. 1B and 4 for example, a pressure sensitive adhesive film 8 can be used to bond an icephobic coating 2 to a substrate surface 4. In various embodiments, the pressure sensitive adhesive can have a peel strength of at least about 2 lbs per inch, at least about 2.5 lbs per inch, at least about 3 lbs per inch, or at least about 5 lbs per inch. In certain embodiments, the pressure sensitive adhesive can have a peel strength in the range of about 2 lbs per inch to about 15 lbs per square inch, or about 5 lbs per inch to about 10 lbs per inch. Peel strength can be measured using, for example, ASTM D903-98(2017)—Standard Test Method for Peel or Stripping Strength of Adhesive Bonds. In various embodiments, one or more adhesion promoters can be added to the pressure sensitive adhesive film to increase adhesion and bonding strength.

As illustrated at operation 200, a pressure sensitive adhesive film 8 can be provided, wherein the pressure sensitive adhesive film layer is configured to fully, or at least partially cover the roughened surface of the icephobic coating/film. As illustrated at operations 215 and 220, the pressure sensitive adhesive film layer can be placed on the roughened icephobic coating/film surface, and then the icephobic coating with the pressure sensitive adhesive film attached thereto can be positioned on top of the roughened substrate surface such that the pressure sensitive adhesive film is in contact with the roughened airfoil surface to provide a layered stack. As illustrated at operation 225, the entire layered stack assembly is then sealed in a vacuum bag and vacuum sealed, as described above. A pressure inside the bag during a vacuum bagging process can be from about 1 psi to about 20 psi, such as from about 7 psi to about 10 psi. Once air is substantially or completely removed from the bond line between the free-standing film and substrate surface, the vacuum is released at operation 230 and excess film (if present) can be trimmed from the edges of the component. The vacuum bag can optionally contain one or more porous breather materials, such as a porous cotton material, disposed within the vacuum bag during the vacuum sealing process. Similar to method 150 described above, breather materials can provide a connection of the vacuum to the assembly surface in embodiments of method 250.

Typical bond test methods include floating roller peel, climbing drum peel, lap shear, and tension. These bond tests apply and measure adhesive stresses in key directions or modes, such as tensile opening, in-plane sliding, and out-of-plane tearing, and are meant to simulate the coating loading environment. However, impact conditions such as sand, rain, ice, and the associated aerodynamic forces are distinctive and are not easily replicated in a simple test coupon setting. The dominant and combination erosion and icing forces simulated by those specific tests are critical to suitably evaluate the effectiveness of the coating to substrate bond. The induced forces and contributions of sand and rain erosion begin with the buildup of internal stresses at and within the bond and bondline interfaces, are aggravated by environmental effects such as moisture and temperature, and are further intensified by coating degradation via thickness reduction and creation/growth of defects. A coating's mechanical properties combined with its inherent defects, e.g., internal voids, low cohesion strength, and surface roughness/texture, define and exacerbate the effects of erosion. Multiple and mixed bondline loads cause interfacial cracking/disbonding, followed by defect and damage growth until failure.

After a vacuum bagging procedure, the coated assembly 10, 15 (with either an epoxy adhesive layer 6 or a pressure-sensitive adhesive layer 8) can have an icephobic composition (layer) 2 of the present disclosure, as described above. For example, the icephobic composition can have a thickness of from about 10 mils to about 50 mils and an average void density of less than 5 voids of size 0.5 mm or greater per cm2, such as less than 1 void of size 0.5 mm or greater per cm2, as determined by optical microscopy, which can provide a smooth, conformal surface of the composition. In at least one aspect, the composition can have a surface roughness of less than about 100 microinches, such as less than about 90 microinches, such as less than about 80 microinches, such as less than about 70 microinches, such as from about 5 microinches to about 100 microinches, such as from about 20 microinches to about 80 microinches, as determined by ASTM D7127-05 (Standard Test Method for Measurement of Surface Roughness of Abrasive Blast Cleaned Metal Surfaces Using a Portable Stylus Instrument). As used herein, "microinches" (Ra) designates the surface roughness as the arithmetical average of all absolute distance of the roughness profile from the centerline within the measuring length. The smooth composition layers of the present disclosure can provide stable laminar flow of water over the fluoropolymer layer, for improved rain erosion and sand erosion.

The bond strength results provided by the bonding methods described herein are surprising due to the fact that the icephobic coatings themselves are designed as anti-fouling surfaces for ice and thus include elements with low surfaces energy and inert oils to help shed ice and low shear stresses. The ability to demonstrate a low adhesive strength on the coating exterior surface with ice while showing excellent adhesion to the underside bonded to the substrate surface is contradictory and unexpected. Such surfaces would be expected to show poor adhesion strength compared to the exceptionally high adhesion requirements necessary for operation on the leading edge of a fixed wing aircraft or rotor blade for example. In these cases, inadequate bonding can result in rapid failure from environmental impacts (e.g., rain droplet impacts at typical vehicle speeds or in the case of rotorcraft the centrifugal force of the blades).

Airfoils

As used herein, "airfoil" comprises a substrate in the shape of a wing or a blade (of a propeller, rotor, or turbine). Airfoils comprise rotor blades, static wing surfaces of rotorcraft or fixed wing aircraft. Airfoils, such as rotor blades, comprise one or more surfaces, such as an outer surface, and one or more components as described in more detail below. As described herein, "airfoil component" comprises any suitable structure adapted, in combination with one or more other airfoil components, to form an airfoil.

In various embodiments, the airfoil comprises an exterior substrate surface comprising at least a portion of the entire exterior airfoil surface. The icephobic coating layers described herein can be coated on the exterior substrate surface. For example, in some embodiments, the airfoil comprises a root section comprising a first root-section-surface; an intermediate section comprising a first intermediate-section-surface; and a tip section comprising a first tip-section-surface. The root section has a first root-section-end and a second root-section end. The intermediate section has a first intermediate-section-end and a second intermediate-section-end. The tip section has a first tip-section-end and a second tip-section-end. The intermediate section is coupled with the root section at a first intermediate-section-end. The tip section is coupled with the intermediate section at a first tip-section-end and a second intermediate-section-end. In various embodiments, the icephobic coating is bonded to the airfoil such that the coating is adjacent to at least one of the first root-section surface, the first intermediate-section-surface, the first tip-section-surface, or a combination thereof. In certain embodiments, the exterior substrate surface, on which the icephobic coating layer is adhered to, comprises at least a portion of a leading edge of the airfoil. See, e.g., FIG. 2.

Rotor blades of the present disclosure comprise one or more rotor blade components. As described herein, "rotor blade component" comprises any suitable structure adapted, in combination with one or more other rotor blade components, to form a rotor blade. As is known in the art, typically a rotor blade of a main rotor assembly is made of a root section, an intermediate section, and a tip section. Each of sections is any suitable geometry to tailor rotor blade aerodynamics to the velocity increase along the rotor blade span. Rotor blade tip section generally comprises an angled geometry such as anhedral, cathedral, gull, and bent, among others. Rotor blade sections define a span of the rotor blade between the axis of rotation and a distal end of the rotor blade tip section along a longitudinal axis between a first edge and a second edge of the rotor blade. Compositions of the present disclosure can be disposed on one or more components of a rotor blade.

EXAMPLES

The present disclosure can be more fully illustrated by the following examples, which are set forth to illustrate some embodiments of the present disclosure and are not to be construed as limiting thereof. All weight percentages are expressed on a dry weight basis, meaning water content is excluded, unless otherwise indicated.

For each of the Examples below, an anti-ice coating according to the present disclosure was prepared. Scotch-Brite™ pads (#7446, #7447) were purchased from McMaster Carr®. 3M™ 9379 tape adhesive was purchased from Jaco Aerospace and Industrial. Hysol™ EA 9696 film adhesive was purchased from Pacific Coast Composites®.

Example 1

A bonding strategy including epoxy film adhesives (FIG. 3) is used to bond an icephobic coating to a substrate surface.

The substrate is abraded using a Scotch-Brite™ #7447 abrasive pad to create a roughened finish. The substrate is subsequently cleaned with a soap solution and rinsed with deionized water. A paper towel is used to pat the substrate dry. Wipes soaked in isopropyl alcohol (IPA) are used to degrease the substrate. Wiping is performed in a single direction using each wipe only once. This process continues until the substrate can be wiped without any noticeable residue coming off. This wiping process is repeated using acetone.

The icephobic coating surface to be bonded is lightly abraded using a Scotch-Brite™ #7446 abrasive pad to create a roughened finish. This surface is degreased with wipes soaked in IPA. Wiping is performed in a single direction and using each wipe only once. This process continues until the coating can be wiped without any noticeable residue coming off.

The Hysol EA 9696 film adhesive is cut into the desired bonding shape and placed onto the prepared substrate. The prepared icephobic coating is trimmed to shape and placed on the film adhesive. This entire setup is then placed in an appropriate vacuum bagging system for the particular bonding shape. This setup is placed into an oven and vacuum is applied (30 in Hg). The oven is then heated at 5° F./min up to 245° F. This temperature of 245° F. is held for 90 minutes before the temperature is ramped back down at 5° F./min to room temperature. The vacuum is released with the icephobic coating bound to the substrate.

Example 2

A bonding strategy including pressure-sensitive film adhesives (FIG. 4) is used to bond an icephobic coating to a substrate surface.

The substrate is abraded using a Scotch-Brite™ #7447 abrasive pad to create a roughened finish. The substrate is subsequently cleaned with a soap solution and rinsed with deionized water. A paper towel is used to pat the substrate dry. Wipes soaked in isopropyl alcohol (IPA) are used to degrease the substrate. Wiping is performed in a single direction using each wipe only once. This process continues until the substrate can be wiped without any noticeable residue coming off. This wiping process is repeated using acetone.

The icephobic coating surface to be bonded is lightly abraded using a Scotch-Brite™ #7446 abrasive pad to create a roughened finish. This surface is degreased with wipes soaked in IPA. Wiping is performed in a single direction and using each wipe only once. This process continues until the coating can be wiped without any noticeable residue coming off.

3M 9379 transfer tape is applied to the roughened side of the prepared icephobic coating. A plastic scraper is used on the backside release layer of the adhesive to assure good contact and limited air gaps between film and adhesive. Any air gaps are popped using a needle and the coating is trimmed to shape. A soap solution is prepared containing 75% deionized water, 25% IPA, and one drop of liquid dish soap per 100 mL. The backside release layer of the transfer tape is removed and a wipe is used to apply a layer of the soap solution onto the adhesive. The soap solution is also applied onto the bonding surface of the prepared substrate. The coating is placed onto the substrate and aligned. The soap solution allows for alignment without prematurely adhering to the substrate. Once aligned, a scraper is drawn from the middle of the coating out to the edges to remove all excess soap solution. The setup is allowed to air dry overnight to remove any residual soap solution. The setup is then placed in an appropriate vacuum bag and vacuum is pulled (30 in Hg). Vacuum is held for at least two hours and up to overnight. The vacuum is released with the coating bound to the substrate.

Example 3

Peel testing is performed in accordance with ASTM D3167 (Floating Roller Peel Resistance of Adhesives). The two variants of the icephobic coatings prepared according to Examples 1 and 2 above were bound using the aforementioned procedure to an aluminum substrate for testing. Icephobic coating 1.0 is a purely solid icephobic coating film. Icephobic coating 1.4 is an icephobic coating with an inert oil added to the coating. It is noted that different icephobic coating formulations can have inherently varying extents of bond-friendly surfaces, and therefore, the bond surface preparation and adhesion methods can be tailored to a specific coating composition in order to provide optimal bonding strength and positive erosion failure properties. The peel test results can be seen in Table 1 below.

TABLE 1

Adhesion results from Flowing Roller Peel Test

| Coating | Adhesive | Substrate | Peel Strength (lbf/in) |
| --- | --- | --- | --- |
| Icephobic Coating 1.0 | Hysol EA 9696 Film | Aluminum | 12.5 ± 1.7 |
| Icephobic Coating 1.4 | 3M 9379 Transfer Tape | Aluminum | 3.7 ± 0.2 |

Example 4

Icephobic coated substrate test samples are prepared by following the bonding procedures described in Examples 1 and 2 above. The two variants of icephobic coatings (icephobic coating 1.0 and icephobic coating 1.4) are bound onto an aluminum substrate. In addition to the bonding techniques and adhesives described in Examples 1 and 2 above, the edges of the test samples are further sealed using a commercial epoxy coating. These samples are submerged in deionized water for eight days at room temperature. Photos of the samples before and after the 8 day water soak can be seen in FIG. 5. After removal, there is no noticeable debonding of the coating from the aluminum substrate (see FIG. 5).

This study also evaluated the peel performance of the icephobic coating 1.0 passive ice protection adhesion film bonded to the aluminum substrate with (1) AF-163-2K epoxy film adhesive, (2) EA 9309.3NA epoxy paste adhesive, or (3) 3M™ 9379 double-sided pressure sensitive adhesive using the bonding techniques described in Examples 1 and 2 above. These three icephobic coating 1.0 samples were compared against samples wherein the icephobic coating 1.0 is coated directly onto a phosphoric acid anodized aluminum substrate and samples wherein the icephobic coating 1.0 is coated directly onto BR127 primed 2024-T3 CLAD aluminum substrates (i.e., without the surface preparation techniques and adhesives used and described in Examples 1 and 2 above).

The peel performance of the icephobic coating 1.0 passive ice protection adhesion film bonded to an aluminum substrate according to Example 1 or 2 above was also compared to the peel performance of a commercially available erosion film, 3M™ 8545NA, bonded using the same substrate, adhesive and surface preparation described in Examples 1 and 2 above. Preparation of the samples is described in more detail below. The Samples tested are listed in Table 2 below.

TABLE 2

Sample List for Peel Performance

| Sample | Adhesive | Substrate |
| --- | --- | --- |
| Icephobic Coating 1.0 | AF-163-2K epoxy film adhesive | 0.063 in PAA and primed aluminum |
| Icephobic Coating 1.0 | EA 9309 epoxy paste adhesive | 0.063 in PAA and primed aluminum |
| Icephobic Coating 1.0 | 3M 9379 PSA | 0.063 in PAA and primed aluminum |
| Icephobic Coating 1.0 | 3M 9379 PSA + adhesion promoter | 0.063 in PAA and primed aluminum |
| 8545 NA | AF-163-2K epoxy film adhesive | 0.063 in PAA and primed aluminum |
| 8545 NA | EA 9309 epoxy paste adhesive | 0.063 in PAA and primed aluminum |
| 8545 HS | 8545 High strength PSA | 0.063 in PAA and primed aluminum |
| 8545 HS | 8545 High strength PSA | 0.063 in PAA and primed aluminum |

PSA stands for "pressure sensitive adhesive"

Procedure

As outlined in Table 2, eight panels were fabricated during this study: four panels using icephobic coating 1.0 film, two panels using 8545NA film, and two panels using 8545HS. Panels containing icephobic coating 1.0 film had dimensions of 4.0×12.0-in and panels containing 8545NA or 8545HS had dimensions of 5.0×12.0-in. The panels were different dimensions due to the width of the as-received icephobic coating film.

Surface Preparation

For all panel configurations, a nominal 0.063-in thick aluminum backing member was phosphoric acid anodized (PAA) and primed with BR127 by Triumph Fabrications (Fort Worth, TX—W/O: J000042314) prior to being received by the lab. The PAA and primed aluminum panels were sheared into 4.0×12.0-in or 5.0×12.0-in subpanels, with the 12.0-in dimension parallel to grain direction. Prior to bonding, faying surfaces were double solvent wiped with isopropyl alcohol prior to bonding.

For all configurations with icephobic coating film, the nominal 0.020-in thick icephobic coating 1.0 films were cut into 4.0×12.0 in sections with a retractable razor blade. The bonding surface, which is the tool surface facing the Mylar, was grit-blasted with 180 grit aluminum oxide media to obtain a uniformly dull finish and subsequently double solvent wiped with isopropyl alcohol. The solvent wipe step was repeated as needed to remove sanding residue.

The nominal 0.040-in thick 8545NA and 8545HS films were cut into 5.0×12.0-in sections with a retractable razor blade. The bonding surface of the 8545NA film, the shiny textured surface, was scuff sanded to produce a uniformly dull surface using a grey Scotch-Brite Blending Hand Pad #7446 and double solvent wiped with isopropyl alcohol. The bonding surface of the 8545HS film was kept as-manufactured.

Panel Fabrication—Film Adhesive Bonded Panels

Structural film adhesive, AF-163-2K film adhesive, was used to bond one panel with icephobic coating 1.0 deice film and to bond one panel with 3M 8545NA polyurethane erosion film. In both panels, one ply of adhesive was used and the FEP crack starter was placed at the interface between the deice film or erosion film peel member and the film adhesive. The panels were autoclave cured with an intermediate dwell at 180 F±10 F for 60 minutes and then at 205 F+0/−5 F for 150 minutes under 30 psi. Heating and cooling rate were 2 F/min. The panel was cured with the peeling member facing the tool and both panels were bonded in the same autoclave run.

Panel Fabrication—Paste Adhesive Bonded Panels

Two-part epoxy paste adhesive, EA 9309.3NA paste adhesive, was used to bond one panel with icephobic coating 1.0 deice film and to bond one panel with 3M 8545NA polyurethane erosion film. The adhesive kit was mixed with a Thinky Mixer using two 30 second cycles at 2000 RPM. FEP for a crack starter was placed between the film member and paste adhesive interface. The paste adhesive was then applied to both prepared aluminum and peel member faying surfaces using a squeegee and acid brush. A bead was poured to the center of the aluminum substrate and the peel member film was gently placed on top of the bead. The assembly was cured using a hot press at 10 psi at 150 F±5 F for 120 minutes±10 minutes.

Panel Fabrication—PSA Bonded Panels

Double-sided pressure sensitive adhesive (PSA), 3M 9379 double-sided PSA, was used to bond two panels with icephobic coating 1.0 deice film: one panel without adhesion promoter and one panel with 3M 86A adhesion promoter. For both panels, one ply of adhesive was used and the FEP crack starter was placed at the interface between the deice film and the pressure sensitive adhesive. For the panel without adhesion promoter, the backer on one side of the 3M 9379 PSA was removed and the exposed PSA was applied to the aluminum faying surface. Next, the remaining backer was removed and the icephobic coating 1.0 deice film was applied to the exposed PSA.

For the panel with 86A adhesion promoter, a thin coat of 86A adhesion promoter was applied to both the aluminum faying surface and icephobic coating 1.0 deice film using a clean wipe soaked with promoter. After allowing the adhesive promoter to dry for a five minutes, a wetting solution (75% distilled water, 25% isopropyl alcohol, 2 drops of Dawn Ultrawashing Liquid per 250 ml of solution) was applied to both the aluminum faying surface and PSA using spray bottle. After the PSA was applied to the aluminum, a squeegee was used to remove excess solution and trapped air. The wetting solution was only utilized when applying the 9379 double-sided PSA to the aluminum faying surface and was not utilized when applying the icephobic coating 1.0 film to the 9379 double-sided PSA. Both assemblies were compacted using a debulk table for 10-15 minutes and a hot press was used to cure the panels at 150 F±5 F and 40 psi for 60 minutes.

Two panels were bonded with 8545HS "High Strength PSA" polyurethane film, one panel with 3M 86A adhesion promoter and one panel without adhesion promoter. The FEP crack starter was placed at the interface between the aluminum and pressure sensitive adhesive. The panel with 86A adhesion promoter utilized the wet installation method as described in the previous paragraph. Both assemblies were compacted and cured as described in in the previous paragraph. Specimens with dimensions of 1.0 in×12.0 in were machined from each panel using a Flow Dynamic waterjet prior to test.

Table 3 summarizes floating roller peel results for specimens bonded with AF-163-2K and EA9309.3NA and specimens bonded with PSA and 86A adhesion promoter.

TABLE 3

Floating roller peel test results from Boeing testing on film, paste and pressure sensitive adhesives.

| Sample | Adhesive | Avg Peel Load lbf/in |
|---|---|---|
| Icephobic coating 1.0 | AF163 | 94 ± 16 |
| 8545 | AF163 | 57 ± 1.3 |
| Icephobic coating 1.0 | EA9309 | 199 ± 3.0 |
| 8545 | EA9309 | 332 ± 3.5 |
| Icephobic coating 1.0 | 9379 PSA | 6.8 ± 0.2 |
| Icephobic coating 1.0 | 9379 PSA + adhesion promoter | 14.6 ± 0.5 |
| 8545HS | PSA | 4.5 ± 0.1 |
| 8545HS | PSA + adhesion promoter | 10.6 ± 0.1 |

As is shown in Table 3, the icephobic film coating 1.0 bonded to an aluminum substrate according to methods of the present disclosure has higher peel strength than all of the control samples except for as compared to the control sample with 3M™ 8545NA film bonded to an aluminum substrate with EA 9309.3NA epoxy paste adhesive. However, the icephobic coating 1.0 film bonded to an aluminum substrate with EA 9309.3NA epoxy paste adhesive still showed a high value bond strength of 199 lbs/in.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that embodiments of the disclosure are not to be limited to the specific embodiments disclosed and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed:

1. An airfoil comprising:
an exterior substrate surface; and
a coating layer adjacent to the exterior substrate surface;
wherein the coating layer comprises an icephobic coating composition comprising:
a first polymer;
a second polymer that is a fluoropolymer;
an isocyanate; and
a curative;
wherein the coating layer is bonded to the airfoil via an intermediate adhesive layer; and
wherein the coating layer has a bottom surface, and wherein the bottom surface has an RMS surface roughness of about 1 micron or greater before the coating layer is bonded to the exterior substrate surface.

2. The airfoil of claim 1, wherein the airfoil is a wing or a rotor blade of an aircraft.

3. The airfoil of claim 1, wherein the exterior substrate surface includes at least part of a leading edge of the airfoil.

4. The airfoil of claim 1, wherein the icephobic coating composition further comprises an inert fluorofluid.

5. The airfoil of claim 4, wherein the inert fluorofluid is present in an amount in the range of about 1 weight percent to about 50 weight percent, based on the total weight of the coating.

6. The airfoil of claim 1, wherein the icephobic coating composition further comprises an inert fluid configured to provide a lubricating effect.

7. The airfoil of claim 1, wherein the intermediate adhesive layer comprises an epoxy film adhesive or an epoxy resin.

8. The airfoil of claim 7, wherein the epoxy film adhesive is an epoxy/amine adhesive.

9. The airfoil of claim 7, wherein the epoxy resin is an epoxy/amine resin.

10. The airfoil of claim 1, wherein the intermediate adhesive layer comprises a pressure sensitive adhesive or a transfer tape configured to bond the coating layer to the exterior substrate surface with the application of pressure.

11. An airfoil comprising:
an exterior substrate surface;
an intermediate adhesive layer on the exterior substrate surface; and
a coating layer on the intermediate adhesive layer, wherein the coating layer comprises an icephobic coating composition comprising a fluoropolymer,
wherein the coating layer has a bottom surface facing the intermediate adhesive layer, and wherein the bottom surface of the coating has an RMS surface roughness of about 1 micron or greater.

12. The airfoil of claim 11, wherein the entire bottom surface of the coating layer is roughened to an RMS surface roughness of about 1 micron or greater.

13. The airfoil of claim 11, wherein only a portion of the bottom surface of the coating layer is roughened to an RMS surface roughness of about 1 micron or greater.

14. The airfoil of claim 11, wherein the exterior substrate surface has an RMS surface roughness of about 1 micron or greater.

15. The airfoil of claim 14, wherein the entire exterior substrate surface is roughened to an RMS surface roughness of about 1 micron or greater.

16. The airfoil of claim 14, wherein only a portion of the exterior substrate surface is roughened to an RMS surface roughness of about 1 micron or greater.

17. The airfoil of claim 11, wherein the intermediate adhesive layer comprises an epoxy/amine adhesive.

18. The airfoil of claim 11, wherein the intermediate adhesive layer comprises a pressure-sensitive adhesive.

19. The airfoil of claim 11, wherein the icephobic coating composition comprises:
   a first polymer;
   a second polymer that is the fluoropolymer;
   an isocyanate; and
   a curative.

20. The airfoil of claim 19, wherein the first polymer of the icephobic coating composition is selected from a polyester, a polyether, a siloxane, or a combination thereof.

21. The airfoil of claim 19, wherein the first polymer of the icephobic coating composition is selected from poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), or combinations thereof.

* * * * *